May 16, 1939. H. COANDA 2,158,405
DEVICE FOR RENDERING VISIBLE INVISIBLE RAYS
Filed June 3, 1936
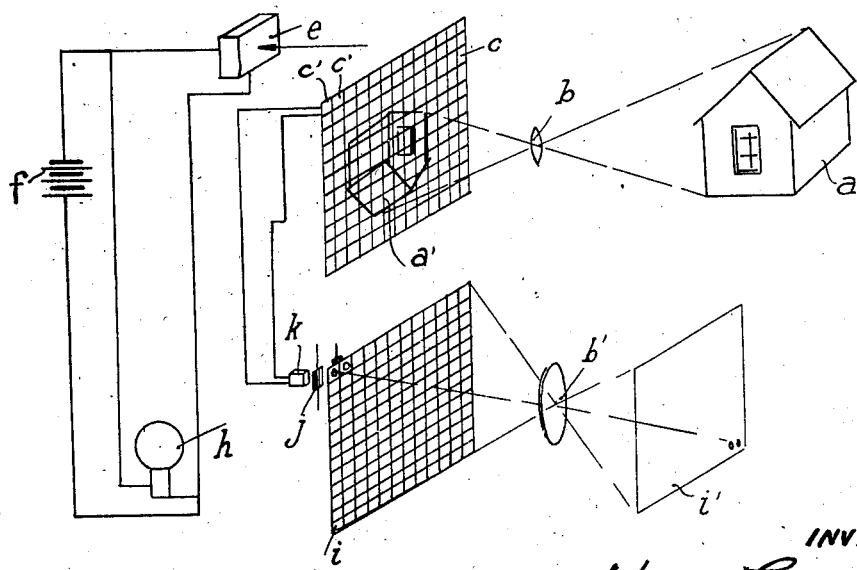
INVENTOR
Henri Coanda,
By Watson, Coit, Morse & Grindle
ATTYS.

Patented May 16, 1939

2,158,405

UNITED STATES PATENT OFFICE 2,158,405

DEVICE FOR RENDERING VISIBLE INVISIBLE RAYS

Henri Coanda, Clichy, France, assignor to Société Anonyme d'Etudes des Brevets et Procédés Coanda—Societe Coanda, a corporation of France Application June 3, 1936, Serial No. 83,348
In Germany June 7, 1935

3 Claims. (Cl. 250—1)

It is a known fact that, among the existing waves of various lengths, the so-called infra-red rays are next to the visible or light rays but are not directly active on the optic nerve because the frequency of the undulation is not sufficient for exciting the optic nervous centers.

This invention relates to a device for rendering visible such rays as are called "invisible", and more particularly, but not exclusively, the effectuating of so-called indirect vision of surfaces and/or objects emitting rays which pertain to the infra-red spectrum. More generally, this invention can be applied in cases where rays other than infra-red—ultra-violet rays, for instance— are to be transformed into visible rays or, alternatively, in cases of the conversion of visible rays into invisible ones, for instance in cases where it is desirable to impress actinic rays on a photographic plate after having changed the frequency of the rays emitted by the object to be detected and having but a low actinic power.

A preferred embodiment of the present invention will be hereinafter described, with reference to the accompanying drawing, given merely by way of example, and in which: the drawing is a diagrammatic view of this embodiment of the invention.

In this embodiment of my invention, I form, through an optical system $b$, a first image of the object $a$ on a screen $c$, which image is, or may be, invisible. This image is reproduced on a second screen $i$, in a visible manner, through cooperation with an illuminating lamp $h$. This lamp is mounted in an electric circuit including a source of current, constituted by battery $f$, or the equivalent. The electric circuit further includes, mounted in shunt with said lamp $h$, a photo-electric cell $e$, hereinafter called "pilot cell", of a well known type, such that an increase in illumination falling upon said cell decreases the resistance thereof. Of course, in view of the shunt connection of this pilot cell with respect to lamp $h$, a decrease of illumination falling upon cell $e$ increases the resistance thereof and therefore increases the flow of current through the branch containing lamp $h$ and therefore increases the illumination supplied by said lamp.

In other words, the intensity of illumination of lamp $h$ varies inversely with the illumination of pilot cell $e$ by the light rays dropping thereon from the direction of object $a$. Means, controlled by the elements of screen $c$, determine the amounts of light that are allowed to pass from lamp $h$ to the corresponding elemental areas of screen $i$, so as to reproduce the image projected in an invisible manner on the first screen $c$.

These means may be of any suitable type. For instance, in the example illustrated by the drawing, screen $c$ consists of the juxtaposition of a multiplicity of photo-electric cells $c'$. As for screen $i$, it may consist of an ordinary translucent screen. Between the lamp $h$ and the elemental areas of said screen $i$, I provide oscillating screens $j$ mounted in an oscillating manner such as that used for the mirrors of galvanometers or oscillographs and the area of which is of a non-uniform transparency varying over its surface according to a regular law, ranging between total absorption and total free passage of light in such manner that the amount of light allowed to pass through each of said screens $j$ depends upon the angular position of said screen about its pivoting axis. The pivoting displacements of these screens $j$ are controlled through devices $k$, themselves controlled by cells $c$, in such manner as to reproduce on screen $i$ an image, of relatively rough texture, but which fully corresponds to the image formed on screen $c$. For instance, devices $k$, which are inserted in the circuits of the corresponding respective photo-electric cells $c'$, are analogous to the means for controlling the angular displacements of the mirrors of galvanometers or oscillographs. In order to improve the image finally obtained, the image formed on screen $i$ is advantageously projected through an optical system $b'$ which reduces its size on a third screen $i'$ on which the image of the invisible object $a$ becomes visible for any organ sensitive to the light rays emitted from source $h$, for instance the optic nerve of the human eye, photographic emulsions, etc.

A device such as that just above described can be employed for many practical purposes, and especially in navigation, for blind flying, and, in a more general way, in all cases in which a movable body intended to move along a predetermined path of travel, is to avoid invisible and accidental obstacles in the course of its movement, it being of course well understood that these obstacles emit or are capable of reflecting invisible rays of suitable frequencies. By way of example of application of the invention, I may cite the determination from a distance of obstacles in foggy weather, such as stationary obstacles (coast, cliffs, rocks, etc.) or movable obstacles (ice-bergs, wrecks, etc.). The device according to the present invention can also be applied to aerial navigation, and, especially, to submarine navigation.

While I have, in the above description, disclosed what I deem to be practical and efficient embodiments of the present invention, it should be well understood that I do not wish to be limited thereto, as there might be changes made in the arrangement, disposition and form of the parts without departing from the principle of the present invention as comprehended within the scope of the appended claims.

What I claim is:

1. A device of the type described, which comprises, in combination, a screen consisting of a multiplicity of photo-electric cells, optical means for projecting the image of an object onto said screen, a second screen, consisting of a multiplicity of elemental areas corresponding to said cells, respectively, an electric source of light for illuminating said second mentioned screen, an electric circuit for said source of light including a source of current, photo-electric relay means, connected with said circuit, responsive to the action of light rays falling thereon from the direction of said object, for controlling the current in said circuit in inverse relation to the illumination of said relay means, and a plurality of means, each for one of the photo-electric cells, for controlling the amount of light from said source adapted to strike the corresponding elemental area of the second mentioned screen, according to the illumination of said cell by the light rays from the object, whereby a visible image of substantially uniform intensity is formed on said second mentioned screen irrespective of the amount of visible light rays transmitted through said optical means from said object to said first mentioned screen.

2. A device of the type described, which comprises, in combination, a screen consisting of a multiplicity of juxtaposed elements, optical means for projecting the image of an object onto said screen, a second screen, consisting of a multiplicity of elemental areas corresponding to said elements, respectively, an electric source of light for illuminating said second mentioned screen, an electric circuit for said source of light including a source of current, photo-electric relay means, connected with said circuit, responsive to the action of light rays falling thereon from the direction of said object, for controlling the current in said circuit in inverse relation to the illumination of said relay means, and a plurality of means, each for one of the elements of the first mentioned screen, for controlling the amount of light from said electric source of light which is adapted to strike the corresponding elemental area of the second mentioned screen, according to the illumination of said element by the light rays from the object, whereby a visible image of substantially uniform intensity is formed on said second mentioned screen irrespective of the amount of visible light rays transmitted through said optical means from said object to said first mentioned screen.

3. A device of the type described, which comprises, in combination, a screen consisting of a multiplicity of juxtaposed photo-electric cells, optical means for projecting the image of an object onto said screen, a second screen, consisting of a multiplicity of elemental areas corresponding to said cells, respectively, an electric source of light for illuminating said second mentioned screen, an electric circuit for said source of light including a source of current, photo-electric relay means, connected with said circuit, responsive to the action of light rays falling thereon from the direction of said object, for controlling the current in said circuit in inverse relation to the illumination of said relay means, a plurality of oscillating elements adapted to pass varying amounts of light in accordance with their respective angular positions, mounted between said source of light and said elemental areas of the second mentioned screen, respectively, and means actuated by said photo-electric cells, respectively, for controlling the angular positions of the corresponding oscillating elements, according to the illumination of said respective photo-electric cells by the light rays from the object, whereby a visible image of substantially uniform intensity is formed on said second mentioned screen irrespective of the amount of visible light rays transmitted through said optical means from said object to said first mentioned screen.

HENRI COANDA.